March 11, 1958 J. J. BARSKI 2,826,290
EXTENSIBLE CONVEYOR
Filed Jan. 20, 1956 4 Sheets-Sheet 2
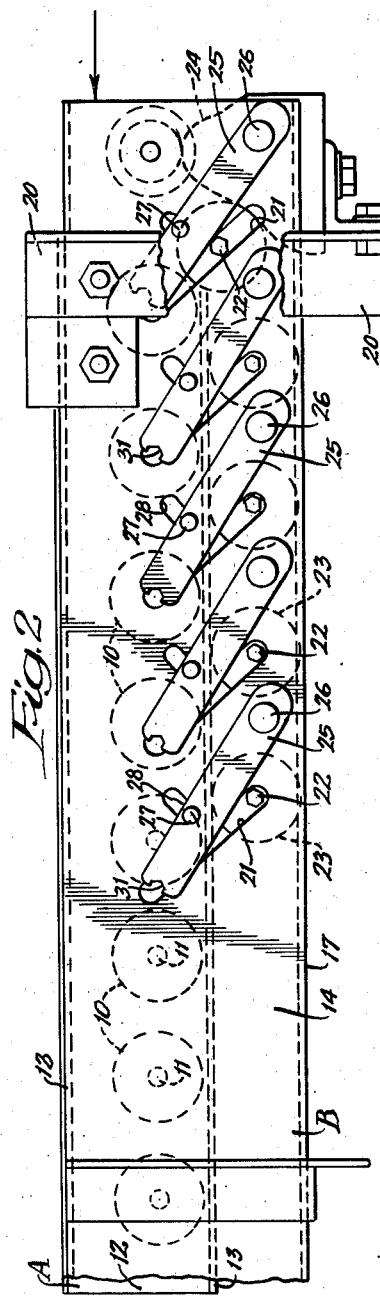
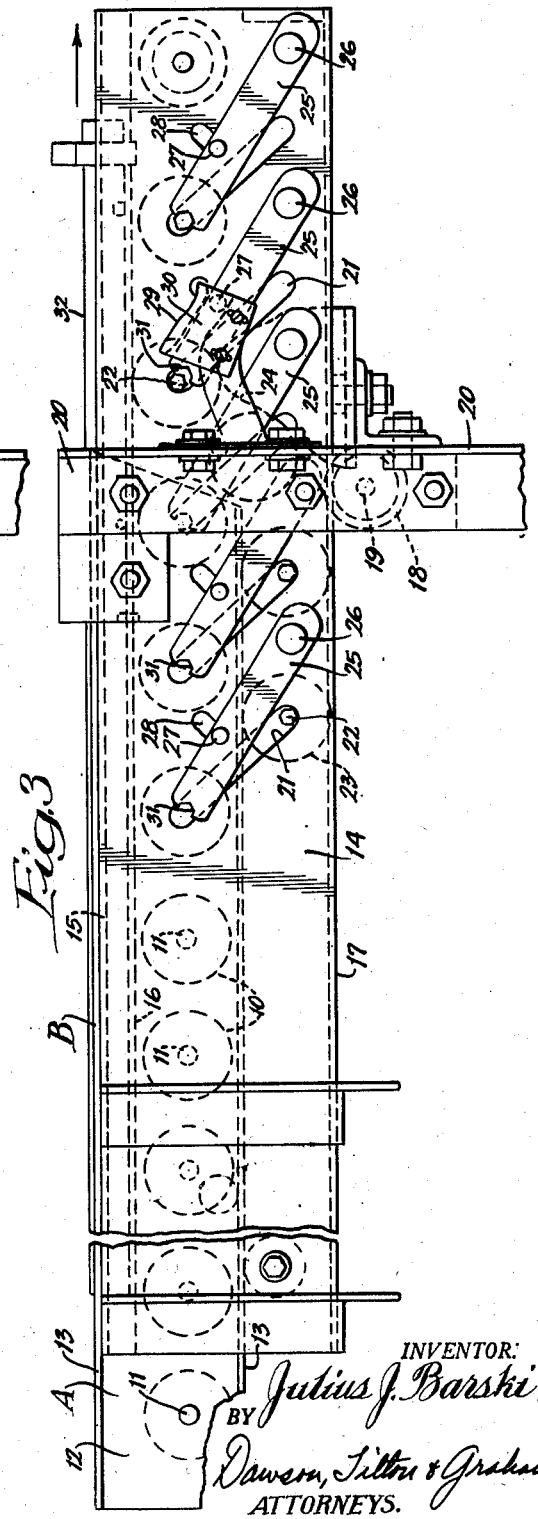
INVENTOR:
Julius J. Barski,
BY
Dawson, Tilton & Graham,
ATTORNEYS.

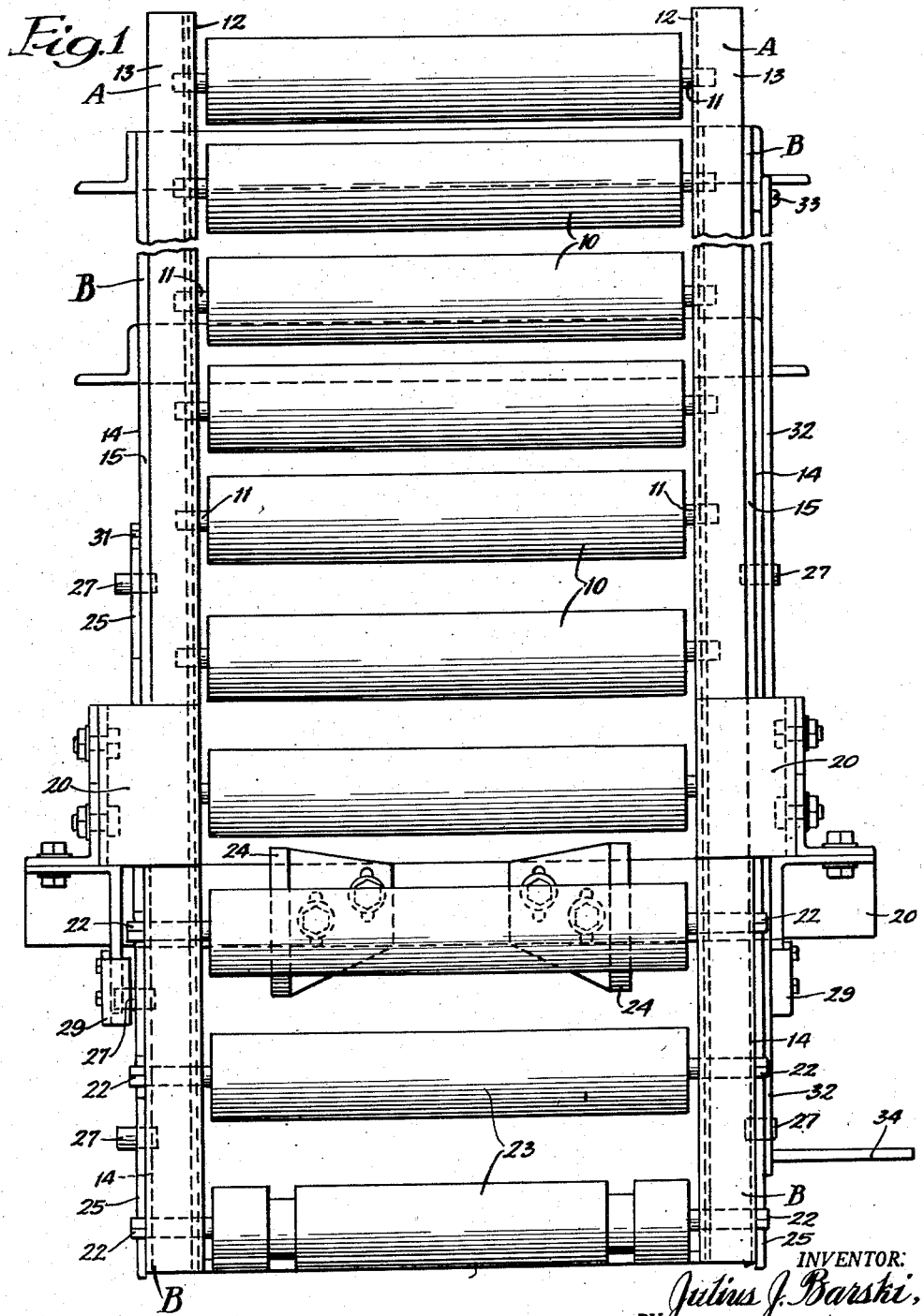

March 11, 1958 J. J. BARSKI 2,826,290
EXTENSIBLE CONVEYOR
Filed Jan. 20, 1956 4 Sheets-Sheet 3
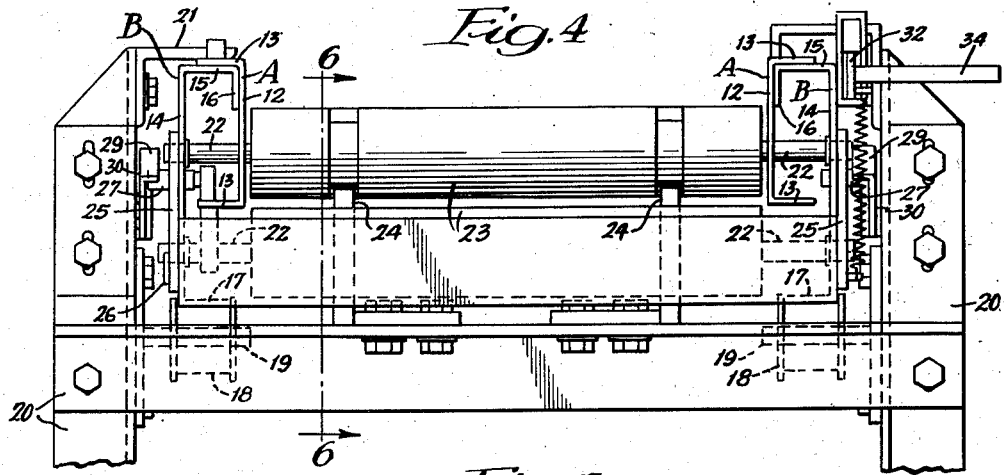
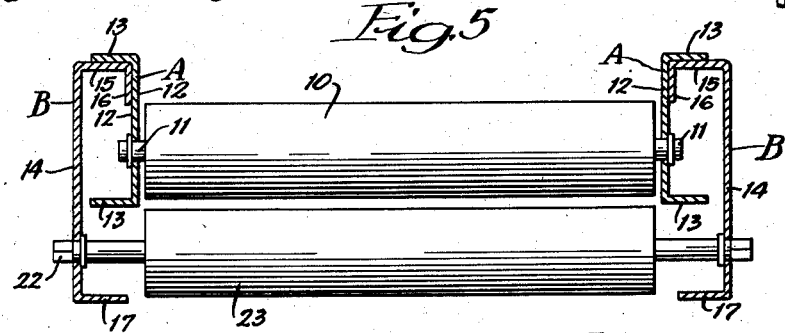
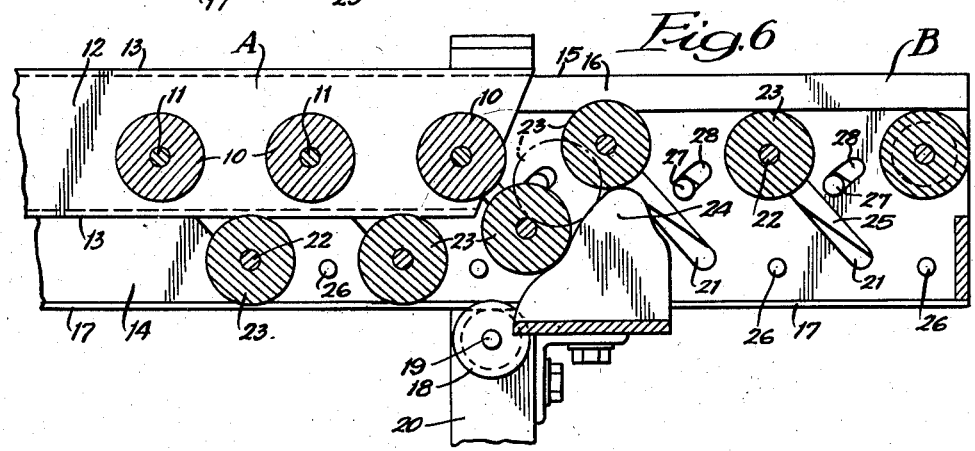
INVENTOR:
Julius J. Barski,
BY
Dawson, Tilton & Graham,
ATTORNEYS.

March 11, 1958  J. J. BARSKI  2,826,290
EXTENSIBLE CONVEYOR
Filed Jan. 20, 1956  4 Sheets-Sheet 4
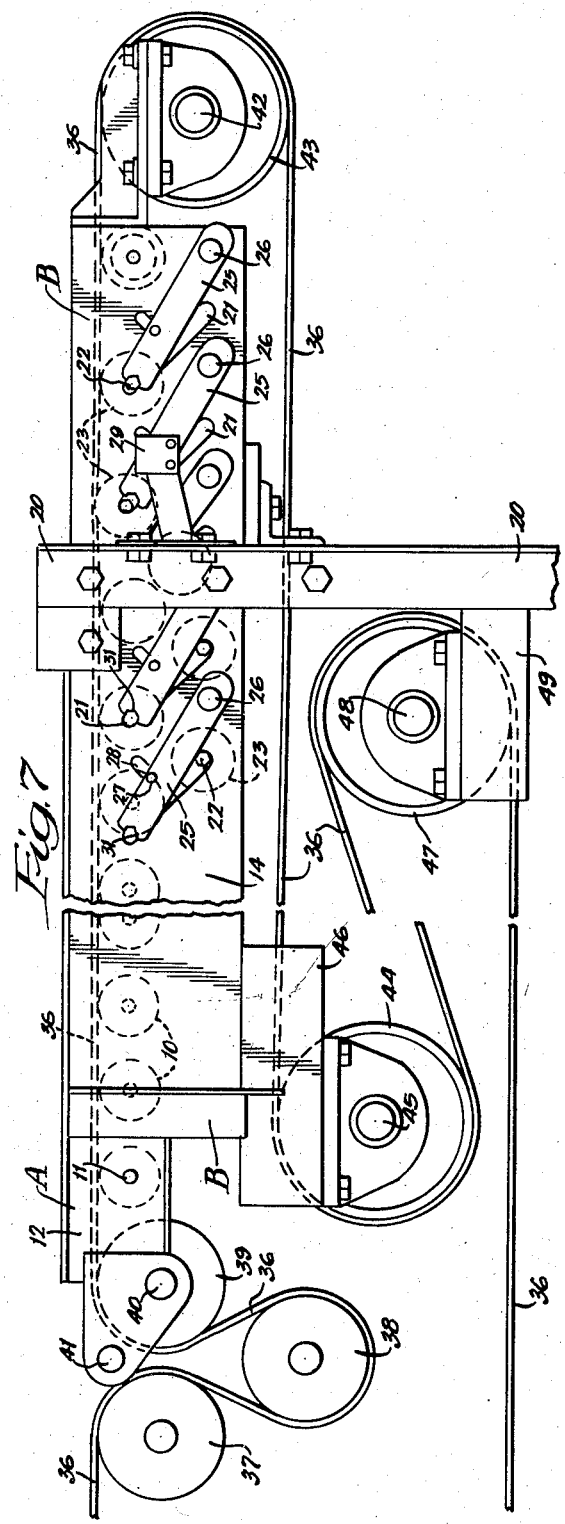
INVENTOR:
Julius J. Barski,
BY Dawson, Tilton + Graham,
ATTORNEYS.

United States Patent Office 2,826,290
Patented Mar. 11, 1958

2,826,290

EXTENSIBLE CONVEYOR

Julius J. Barski, Chicago, Ill., assignor to The Lathrop-Paulson Company, Chicago, Ill., a corporation of Illinois Application January 20, 1956, Serial No. 560,425

15 Claims. (Cl. 198—139)

This invention relates to an extensible conveyor, and is particularly useful in connection with roller conveyor sections for conveying objects and to conveyors equipped with continuous belts, etc.

An object of the invention is to provide an extensible conveyor equipped with rollers and in which the sections of the conveyor can be telescoped while, when a section is extended, the rollers of the extended section are substantially aligned with those of the other section. A further object is to provide conveyor sections equipped with rollers which may be compactly supported in telescoped relation while, when one section is withdrawn from the other, the rollers of the extended section are elevated into a position aligned with the rollers of the first section. A still further object is to provide such a conveyor system in which the sections may be moved angularly to permit discharge or loading from various angularly-related points. Yet another object is to provide such a conveyor structure in which belts are employed with the roller sections for the discharge or loading of objects or material. Yet a further object is to provide in such a structure an extensible section equipped with rollers movable to raised and lowered positions and simple means for moving the rollers so that the rollers may be maintained in lowered position during the telescoped position of the sections and in a raised position during the operation of the extended portion of the sections. A still further object is to provide means whereby the rollers of the extended section or partially-extended section are individually raised and lowered in the withdrawing or retraction of the section. Other specific objects and advantages will appear as the specification proceeds.

The invention is shown, in illustrative embodiments, by the accompanying drawings, in which—

Figure 1 is a top plan view of conveyor mechanism embodying my invention; Fig. 2, a broken side view in elevation showing the sections in telescoped relation; Fig. 3, a view similar to Fig. 2, but showing the second section partly withdrawn from the first section; Fig. 4, a broken end view of the extensible conveyor; Fig. 5, a vertical sectional view of the frame members of the two conveyor sections shown apart from the frame and other parts of the apparatus; Fig. 6, a broken vertical sectional view, the section being taken as indicated at line 6—6 of Fig. 4; and Fig. 7, a broken side view in elevation of a modified form of the invention in which a conveyor belt is employed with the roller sections.

In the illustration given in Figs. 1-6, inclusive, A designates an inner or first conveyor section, while B designates a second or movable roller conveyor section. It is believed that the main features of the conveyor can best be seen by examining the sheet containing Figs. 4, 5 and 6. Fig. 5 shows the two conveyor sections in a telescoped arrangement. The upper section A may be a fixed section equipped with rollers 10 having roller shafts 11 extending through apertures in the web portion 12 of the U-beam forming the frame of the conveyor section A. The beam is provided with outwardly-extending end flanges 13. In the illustration given, the section A is an ordinary or typical conveyor section, and the rollers 10 are carried by the usual roller shafts 11 received within openings in the web 12. The rollers thus are supported in fixed relation within the section A and the rollers may be horizontally aligned or aligned at any desired angle for the conveying of articles thereon.

The conveyor section B is illustrated as an extensible section, and this section is characterized by having very deep side walls 14 which extend well below the conveyor section A. The side wall portions 14 have inwardly-turned top flanges 15 terminating in downwardly-turned portions 16 lying within the beam of the upper conveyor A, as illustrated best in Fig. 5. The side walls 14 have at their bottom inwardly-turned flanges 17 which rest upon rollers 18 supported upon shafts 19 and carried by the conveyor frame 20, as shown best in Fig. 4. Thus, the section B telescopically engages the fixed section A and is mounted upon the anti-friction bearings 18 for movement into and out of telescoping relation with conveyor A.

The side walls 14 of conveyor B are provided with vertically-inclined slots 21, as shown best in Fig. 6. These vertically-inclined slots receive the roller shafts 22 carrying rollers 23 within the second conveyor section B, and the slots are long enough to permit the rollers 23 to move into a position below the upper rollers 10 of the first section A and also to be raised to a position aligned with the upper rollers 10 of section A. The length of the slots 21 permitting the two widely spaced positions of the rollers 23 is illustrated in Fig. 6 in conjunction with a pair of cam members 24 which are employed for raising the rollers 23 from the lowermost position as seen on the left-hand side of Fig. 6 to their upper position, as seen on the right-hand side of Fig. 6. It will thus be seen that the rollers 23 are raised by the cam 24 to their high position as the section B is moved outwardly, and are dropped to their lower position as the section B is moved inwardly into telescoping position. It now remains to be seen how the rollers 23 may be releasably held in their raised position, as illustrated at the right-hand side of Fig. 6 so that the rollers may be maintained in a position aligned with the rollers 10 of section A. Latching means for this purpose will next be described.

As seen best in Figs. 2-4, inclusive, latch bars 25 are secured by pins 26 to the lower portion of the side wall 14 of section B, each bar 25 lying adjacent one of the elongated slots 21. Each latch bar is provided at an intermediate point with a guide stud 27 which extends through the bar 25 and on its inner side engages a short slot 28 which limits the swinging movement of the latch bar 25. The outer portion of the stud 27 is employed as a guide means which will be later described and which is cooperative with a cam for moving the latching bar into a position for engagement with the shaft 22 of the rollers 23 when the roller is to be supported in raised position and for releasing the shaft 23 from the latch bar when the roller is to be released for return to its lower position.

The cam structure just referred to can best be seen in Fig. 3. The cam comprises a metal block 29 providing therein a curved slot 30 receiving the guide stud 27 of the latch bars 25. The curvature of the slot 30 within the block 29 guides the latch bar 25, bringing it to a position where it will receive the shaft 22 of the raised roller 23. For the latter purpose, the latch bar 25 is preferably provided at its top with a multisided opening 31 adapted to receive the hexagonal-shaped end of the shaft 23.

The cams 24 are secured upon the frame 20, as illustrated best in Figs. 1, 3 and 6, and in operation, the cams engage the rollers 23 and raise them individually within their inclined slots 21 to the elevated position shown in Fig. 6 as section B is drawn outwardly.

To facilitate the drawing movement of section B, I have illustrated a long drawbar 32, pivotally mounted by the pin 33 to the rear of section B, and at the forward end, the bar 32 is equipped with a handle 34. If desired, the bar 32 may be equipped on its underside with teeth for engaging an edge (not shown) of the frame 20 for latching the sections in any desired position. A spring 34 may be employed for drawing the latch bar 32 downwardly. If desired, the latch bar 32 may be omitted.

Operation

In the operation of the apparatus, the roller section A operates as any ordinary roller section, the rollers 10 therein simply rotating within fixed positions in the section A, and when the structure is in collapsed position, as illustrated in Fig. 2, the rollers 23 of section B lie below the rollers 10 of section A. When it is desired to extend the section B, the rollers advance into contact with the cams 24 and are moved upwardly and rearwardly, as illustrated best in Fig. 6, until they reach the elevated position at the top of the cam. Simultaneously with the above operation, a latch bar 25 adjacent the raised roller 23 is moved to the position illustrated at the right-hand side of Fig. 3, so that the notch 31 in the upper end of the latch bar 35 is aligned with the slot 21 and in a position to receive the shaft 22 of roller 23. In the actual operation, the shaft 22 of the roller rises to a point slightly above the notch 31 of the latch bar 25, and the shaft then, as the roller 23 passes over the crest of the cam 24, drops downwardly and into the waiting notch 31 of the latch bar. As the conveyor section B is drawn outwardly, each latch bar is thus brought into engagement with the shaft of an elevated roller, and all of the elevated rollers are thus held by their respective latch bars in a position aligned with the rollers 10 of section A.

When section B is moved rearwardly to bring it into telescoping relation again with section A, the cam 29 again engages the guide stud 27 of each latch bar 25 as it approaches the cams 24, and as the roller is slightly elevated, the latch bar is held against downward movement until the roller rolls down the cams 24, as illustrated best in Fig. 6, and thereafter the latch bar falls to the lower end of its position, as illustrated best in Fig. 2. It will be noted in Fig. 2 that the roller shaft 22 of the rollers 23 lies in its lowermost position and each of the latch bars 25 also swings downwardly toward the shafts 24 and are held in position by the engagement of the pins 24 with the inner limit slots 28.

From the foregoing description, it will be observed that the movable section B may be drawn outwardly rapidly, causing the rollers therein to move to a vertical position in alignment with the rollers 10 of section A and are securely latched in the raised position by the latch bars 25, while, upon reversal of the movement, the rollers are freed from the latch bars 25 and moved down to their lower position under the rollers 10 of section A so that the two conveyor sections can be telescoped together.

It will be understood that the sections A and B may be arranged in different relationship, with one section being made movable and the other fixed, or both being relatively movable, and it will also be understood that the sections may be pivotally supported for angular movement so as to permit discharge or loading at different angular positions. Further, the apparatus may be equipped with belts, such as endless conveyor belts, for the discharged material or objects carried thereon.

In the modification shown in Fig. 7, I provide apparatus in which the two sections A and B are the same as those described in Figs. 1–6, inclusive, except that these two sections are pivotally mounted upon a support so as to permit the sections to be raised or lowered, and except also that the parts are equipped with a continuous conveyor belt 36. The continuous conveyor belt 36 passes over the rollers or drums of an ordinary conveyor, and thence pass over the rollers indicated as 37, 38 and 39, the purpose of these rollers being to facilitate the tilting of the pivotally-mounted conveyor sections. The conveyor section A is pivotally supported upon the shaft 40 which also carries roller 39, and by means of this pivot, the roller sections can be raised or lowered to permit discharge or loading at various inclined positions, and this is accomplished without interruption of travel of the belt 36. To facilitate the passing of objects from the sections of the belt between the rollers 37 and 39, I provide an intermediate, freely-rotating roller 41, on which objects move from the inner portion of the belt to the outer portion of the belt, passing over section A.

To provide a support for the outer end of the belt 36, I equip the section B with a shaft 42 on which is mounted a roller 43. The belt 36 leaving roller 43 passes inwardly and over a roller 44 carried by shaft 45 mounted on a depending frame 46 carried by the movable section B, so that as the section B moves, the take-up roller 44 moves therewith. The belt 36 leaving the roller 44 passes over a fixed roller 47 mounted upon shaft 48 carried by the fixed frame 49 on frame 20. The belt portion leaving roller 47 moves rearwardly to the ordinary belt conveyor (not shown).

In the operation of the structure shown in Fig. 7, the extensible section B may be drawn outwardly or inwardly, and in this operation the rollers of section B operate in the same manner as heretofore described. At the same time, the belt 36 remains in operative position as the extension section B moves inwardly and outwardly, this movement being permitted without affecting the belt 36 by reason of the movable roller or drum 44 carried by section B.

It will be understood that the section 20 may be equipped with means for raising and lowering it, and that various types of accessories well known in the conveyor field may be employed in their usual manner with the conveyor structure shown.

While, in the foregoing specification, I have set forth a specific structure in considerable detail for the purpose of illustrating embodiments of my invention, it will be understood that such details may be varied widely by those skilled in the art without departing from the spirit of my invention.

I claim:

1. An extensible conveyor, comprising a first conveyor section equipped with a row of aligned rollers, a second conveyor section equipped with side walls telescopically and slidably engaging said first section and extending below the rollers of said first section, said side walls having vertically-extending slots therein, rollers in said second section equipped on both sides with shafts received within the slots of said walls and movable therein to bring the rollers of the second section below the rollers of the first section and vertically into alignment with the rollers of the first section, and means associated with said first section for bringing said rollers of said second section into said raised and lowered positions upon horizontally-extending and retracting said second section in relation to said first section.

2. The structure of claim 1, in which cams are employed for raising the rollers of the second section.

3. The structure of claim 1, in which cams are employed for raising the rollers of the second section and in which said slots are inclined vertically and rearwardly.

4. An extensible conveyor, comprising a first conveyor section equipped with a row of aligned rollers, a second conveyor section equipped with side walls telescopically and slidably engaging said first section and extending below the rollers of said first section, said side walls having vertically-extending slots therein, rollers in said second section equipped on both sides with shafts received within the slots of said walls and movable therein to bring the rollers of the second section below the rollers of the first section and vertically into alignment with the rollers of the first section, means associated with said first section for bringing said rollers of said second section into said raised and lowered positions upon relative movement of said sections, and latch means for supporting the rollers of said second section in raised position.

5. An extensible conveyor, comprising a first conveyor section equipped with a row of aligned rollers, a second conveyor section equipped with side walls telescopically and slidably engaging said first section and extending below the rollers of said first section, said side walls having vertically-extending slots therein, rollers in said second section equipped on both sides with shafts received within the slots of said walls and movable therein to bring the rollers of the second section below the rollers of the first section and vertically into alignment with the rollers of the first section, cam means associated with said first section for bringing said rollers of said second section into said raised and lowered positions upon relative movement of said sections, and releasable latch means for supporting the rollers of said second section in raised position.

6. An extensible conveyor, comprising a first conveyor section equipped with a row of rollers, a second conveyor section equipped with side walls telescopically engaging said first section and having a depending section below the rollers of said first section, said side walls having vertically- and rearwardly-extending notches therein, rollers in said second section equipped on both sides with shafts received within the notches of said side walls, cam means for raising the rollers as the second section is horizontally-extended in relation to said first section, latch bars pivotally mounted upon said side walls and having notches adapted to be aligned with the shafts of said rollers of said first section for supporting said shafts of the rollers in raised positions, guide studs carried by said latch bars, and cam means cooperating therewith for moving said latch bars into aligned and non-aligned positions with respect to the roller shafts of said second section during the raising anad lowering of said rollers.

7. The structure of claim 6, in which said latch bars are equipped with angular sides and said roller shafts of said second section are multisided for engagement with said notches for preventing rotation of said shafts.

8. The structure of claim 6, in which said latch bars are equipped with limit lugs engageable with slots in said side walls.

9. In combination, a fixed conveyor section equipped with rollers arranged in a row, a movable conveyor section supported for sliding movement in adjacent relation to said first section and having deep side walls equipped with vertically-extending slots, rollers in said second mentioned section equipped on both sides with shafts engaging said slots, cam means supported in alignment with said rollers of said second section for raising and lowering the same as the movable conveyor section is extended and retracted relative to the fixed conveyor section, and means for releasably supporting said rollers individually in raised position and in alignment with the rollers of said first-mentioned conveyor section.

10. In combination, a fixed conveyor section equipped with rollers arranged in a row, a movable conveyor section supported for sliding movement in adjacent relation to said first section and having deep side walls equipped with vertically-extending slots, rollers in said second-mentioned section equipped on both sides with shafts engaging said slots, cam means supported in alignment with said rollers of said second section for raising and lowering the same as the movable conveyor section is horizontally extended and retracted relative to said fixed conveyor, means for releasably supporting said rollers individually in raised position and in alignment with the rollers of said first-mentioned conveyor section, a continuous belt extending over said rollers of said sections, a roller at the outer end of said second conveyor section receiving said belt, a second roller carried by said second conveyor section at the inner end thereof to receive said belt, a frame supporting said first-mentioned conveyor section near the outer end thereof, and a roller carried by said frame and receiving said belt from said second-mentioned belt roller.

11. In a conveyor structure, a frame, a first conveyor section pivotally mounted at its inner end upon said frame, rollers carried by said first section, a second section telescopically engaging said first section and equipped with side walls having vertically-extending slots therein, rollers equipped with shafts engaging said slots of said second section, means for raising and lowering the rollers of said second section as it is horizontally extended and retracted relative to said first section, means for releasably supporting said rollers of said second section in raised position and in alignment with the rollers of said first section, and an endless belt extending over the rollers of said second section.

12. The structure of claim 11, in which said first section is equipped at its inner end with a belt-receiving roller and in which a belt-receiving roller is supported at a spaced distance from said last-mentioned roller, and a third roller is supported below and between said last-mentioned belt rollers, whereby said endless belt passes over the upper rollers and about the lower roller.

13. The structure of claim 11, in which said first section is equipped at its inner end with a belt-receiving roller and in which a belt-receiving roller is supported at a spaced distance from said last-mentioned roller, and a free roller supported between said uppermost spaced belt rollers.

14. An extensible belt conveyor, comprising a first section equipped with a row of rollers, a second conveyor section equipped with side walls telescoping with said first section and extending therebelow, said side walls having vertically-extending slots therein, rollers in said second section equipped on both sides with shafts received within the slots of said side walls, cam means for raising and lowering the rollers of said second section as it is extended and retracted relative to said first section, means for releasably supporting the raised rollers in raised position, a continuous belt extending over the rollers of said section, an end belt roller carried by said second section for receiving said belt, a second roller carried by the other end of said second section and receiving said belt, and a fixed roller supported adjacent the end of said first section and receiving said belt, whereby said second section may be moved inwardly and outwardly with the belt in engagement with the rollers of the first section and the raised rollers of the second section.

15. The structure of claim 13, in which the first section is supported at its outer end with a frame provided at its lower end with anti-friction means for slidably supporting the second section.

No references cited.